April 17, 1962 H. W. GROCE 3,030,118
SEAL FOR A ROTATING SHAFT
Filed May 13, 1958
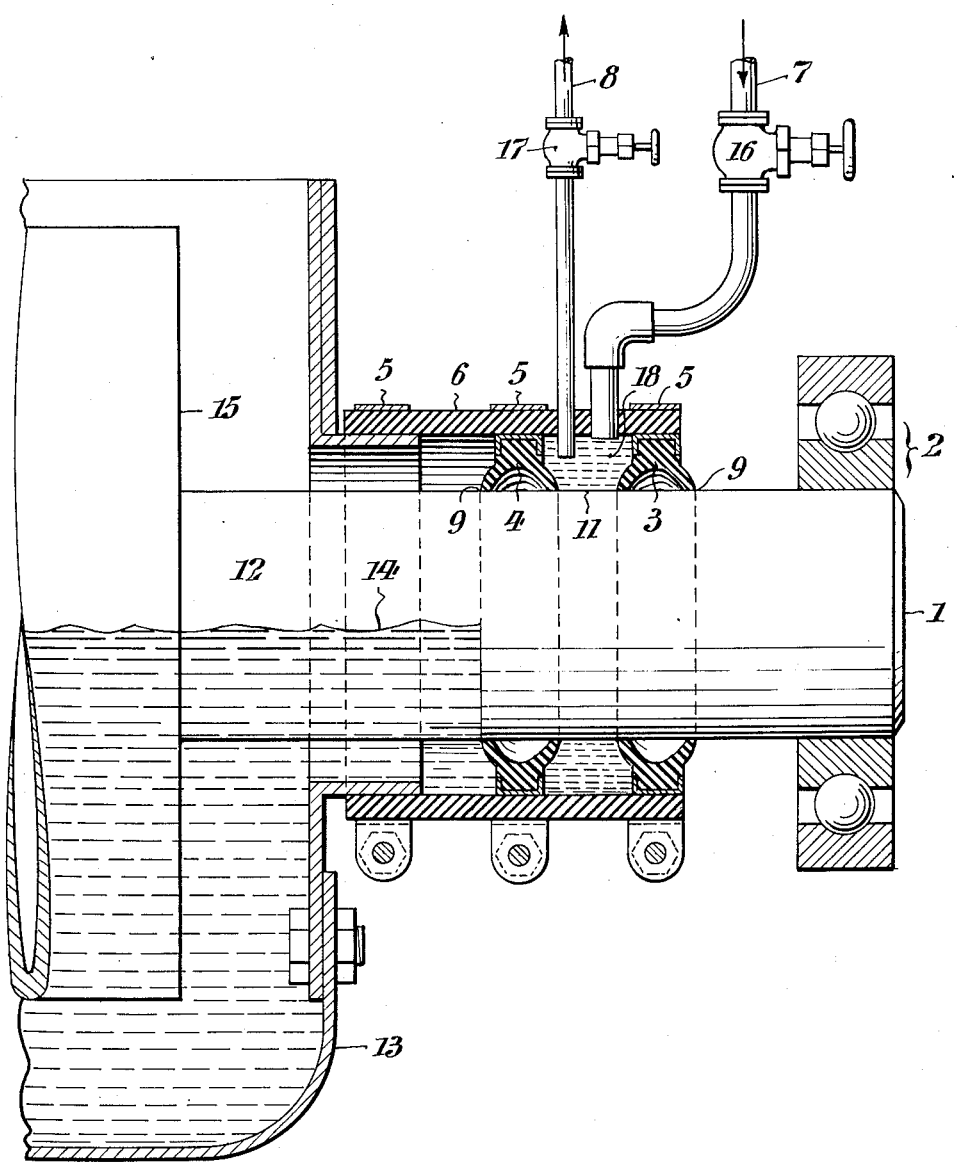
INVENTOR.
Homer W. Groce,
BY Paul & Paul
ATTORNEYS.

United States Patent Office 3,030,118
Patented Apr. 17, 1962

3,030,118
SEAL FOR A ROTATING SHAFT
Homer W. Groce, Gastonia, N.C., assignor to Cocker Machine & Foundry Company, Gastonia, N.C., a corporation of North Carolina
Filed May 13, 1958, Ser. No. 762,671
3 Claims. (Cl. 277—4)
(Filed under Rule 47(b) and 35 U.S.C. 118)

This invention relates to an improved device for sealing a rotating shaft. In particular it relates to an improved device for sealing a rotating shaft extending into a fluid container to prevent the seepage of fluid from the container at the shaft opening.

Frequently it is necessary to extend the shaft of a rotor, roll or other rotating device, through the wall of a fluid container below the level of fluid contained therein, as, for example, in certain kinds of industrial mixers, textile size boxes, and similar apparatus. However, the presence of an opening in such a container for the entry of the shaft presents a difficult problem of sealing the opening around the rotating shaft to prevent the leakage of fluid along the shaft. In the past such sealing has variously been effected by tightly packing, pressing, or fitting resilient materials of one kind or another between the rotating shaft and the container wall, or some housing contiguous thereto. In the customary seals of this kind, however, inadequate provision has heretofore been made for the characteristic tendency of the shaft to vibrate or wobble upon rapid rotation; still less adequate provision has been made for the tendency of the shaft to become deflected when subjected to heavy loads. The effect of such vibrations and deflections of the shaft is to cause the resilient material of which the seal is made to become distorted out of shape after a relatively short span of use, thereby losing its effectiveness as a fluid seal. Moreover, seals of the type of the familiar stuffing-box and gland depend upon the compression of the sealing material around the shaft to accomplish an effective sealing, the pressure exerted thereby causing excessive wear on the shaft with a resultant, progressively increased, difficulty of preventing leakage. Still another undesirable feature of some of the seals in current use is that the fluid seepage from the container is itself used as a lubricant between the sealing material and the rotating shaft. Where such fluids have the effect of hardening upon cooling or upon drying out, the resiliency and close fit of the sealing material is destroyed, again with resultant leakage around the shaft.

It is an object of this invention to provide a resilient sealing device about a rotating shaft extending into a fluid container which will accommodate itself to the vibrations and deflections of the shaft, even when subjected to heavy loads, while retaining its shape and close fit without distortion.

It is another object of this invention to provide a device for sealing a rotating shaft with the use of only moderate pressures upon the shaft to avoid excessive wear.

It is a further object of this invention to prevent the entry of fluid from the container into the sealing area.

It is a still further object of this invention to provide at the same time a method of lubricating the shaft within the sealing area.

Other objects and advantages of this invention will further become apparent hereinafter and in the drawings, in which:

The drawing is a vertical sectional view illustrating a specific form of apparatus in accordance with this invention.

The following description is directed to the specific form of the apparatus and method as shown in the drawing and is not intended to be addressed to the scope of the invention itself, which is capable of being practiced in a wide variety of forms and arrangements.

Adverting herewith to the specific form of the invention illustrated in the drawing, a journal 1 of rotatable shaft 12 connected to a roll 15 in a fluid container having the form of a pan 13 is supported by a bearing 2 exterior to the container. Mounted circumferentially upon the shaft 12 are two rubber sealing members 3 and 4 with intervening space 11 between them. A flexible housing 6 surrounds a part of the shaft 12 and is preferably made by Teflin, a polymer of tetrafluoroethylene, but may be made of any other inert flexible material. The housing 6 is sealingly clamped to pan 13 and also to the sealing rings 3 and 4 by band type clamps 5. An enclosed chamber 18 is thereby formed, bounded by the flexible housing 6, sealing members 3 and 4, and the shaft 12.

Steam (or any other suitable fluid) is introduced through an inlet tube 7 extending through the housing 6 into the enclosed chamber 18. The steam, condensing in the enclosed chamber 18, provides water which serves as a lubricant between the rotating shaft 12 and the sealing members 3 and 4. Any excess liquid in the chamber 18 is drained off through an outlet tube 8 extending through the top of the housing 6. The rate of outflow through the tube 8 is regulated by valve 17.

While the condensing vapor lubricates the sealing area, the continual inflow of steam through the inlet tube 7 furnishes an effective back pressure within the enclosed chamber 18 sufficient to prevent the entrance of fluid 14 from the body of the pan 13 into the sealing area past sealing member 4. A regulating valve 16 is provided to regulate the flow of steam through the inlet tube 7 into the enclosed chamber 18 and thereby maintain pressures within the chamber effectively to prevent the flow of fluid 14 past sealing member 4.

When the rotation of the shaft 12 causes it to wobble or when the shaft is deflected upon subjecting the roll 15 to heavy loads, the flexible housing 6 permits the sealing members 3 and 4 to move along with the shaft thereby preventing the opening 9 in the sealing members 3 and 4, through which the shaft passes, from becoming distorted into an oval shape with resultant leaking of fluid past the sealing members.

Since the fluid from the container frequently has a deleterious effect upon the sealing members by hardening upon drying out and thereby destroying their resiliency, it will be apparent that the provision of an effective back pressure to prevent the entrance of fluid from the container into the sealing area is an important advantage of this invention, greatly increasing the efficiency of the sealing structure. This advantage, when taken together with the ability of the sealing members to accommodate themselves to deflections of the shaft by means of a flexible housing further adds to the durability and long life of the seal.

Since the pressures exerted by the sealing members themselves upon the shaft are relatively light, the wear upon the shaft is slight and consequently another factor contributing to leakage around the shaft is eliminated.

Moreover, the simplicity of the entire arrangement is such that it may easily be removed through the bearing housing should it ever be necessary to replace, it thereby making it unnecessary to remove the roll from the container.

It will be understood that although in the preferred embodiment of this invention the sealing members 3 and 4 are made of rubber, their composition is not necessarily so limited; they may alternatively be made of various fibrous materials, graphite, or a combination of such materials.

Although this invention has been disclosed with reference to specific forms and embodiments thereof, it should be evident that a great number of variations may be made without departing from the spirit and the scope of this invention. For example, parts may be reversed, equivalent elements may be substituted for those specifically disclosed and certain features of the invention may be used independently from other features, all without departing from the spirit and scope of this invention as defined in the appended claims.

Having thus described my invention, I claim:

1. In a sealing device for a rotating shaft extending into a fluid container, said shaft having a plurality of resilient annular sealing members spaced apart from one another longitudinally along said shaft and arranged in circumferential contact therewith, the combination which comprises a flexible housing sealed to said container, said housing being arranged to surround a part of said shaft and being sealed to the outer peripheries of said sealing members to form an enclosed chamber intermediate said members, means communicating into said chamber for the admission of fluid thereinto under pressure whereby a differential pressure is created within said housing, and exhaust means communicating into said housing through the top thereof for the removal of fluid therefrom.

2. The device defined in claim 1, in which the pressure within the enclosed chamber is greater than the pressure exerted upon the exterior of said chamber.

3. In a sealing device for a rotating shaft extending into a fluid container having a fluid in contact with at least a portion of said shaft, said device including a pair of resilient annular sealing members spaced apart from one another longitudinally along said shaft and arranged in circumferential contact therewith, said sealing members each having an outer peripheral ridge formed thereon, the combination which comprises a flexible housing of inert material sealed to said container, said housing being arranged to surround a part of said shaft and being sealingly engaged to the outer peripheral ridges of said sealing members to form an enclosed chamber therebetween, said chamber being disposed about said shaft to provide an annular space within said housing between said container and said chamber, fluid introducing means communicating into said chamber through said housing for the admission of fluid thereinto whereby a differential pressure is created between said chamber and said annular space and exhaust means communicating into said chamber through the top of said housing for the removal of fluid therefrom.

References Cited in the file of this patent

UNITED STATES PATENTS

| | | |
|---|---|---|
| 1,230,065 | Cash | June 12, 1917 |
| 2,257,011 | Hillier | Sept. 23, 1941 |
| 2,273,129 | Messinger | Feb. 17, 1942 |
| 2,274,234 | Ekkebus et al. | Feb. 24, 1942 |
| 2,303,232 | Rupp | Nov. 24, 1942 |
| 2,329,050 | Humphreys | Sept. 7, 1943 |
| 2,422,007 | Gilbert | June 10, 1947 |
| 2,721,748 | Tremolada | Oct. 25, 1955 |